(12) United States Patent
Salehomoum et al.

(10) Patent No.: US 11,076,197 B1
(45) Date of Patent: Jul. 27, 2021

(54) SYNCHRONIZATION OF MULTIPLE VIDEO-ON-DEMAND STREAMS AND METHODS OF BROADCASTING AND DISPLAYING MULTIPLE CONCURRENT LIVE STREAMS

(71) Applicant: ViuCom Corp., Bellevue, WA (US)

(72) Inventors: Nader Salehomoum, Bellevue, WA (US); Ali Asghar Mottaghian, Kuala Lumpur (MY); Mosaad Ahmed Abelrazik Elsayed, Kuala Lumpur (MY); Vahid Pashaei, Kuala Lumpur (MY)

(73) Assignee: ViuCom Corp., Bellevue, WA (US)

( * ) Notice: Subject to any disclaimer, the term of this patent is extended or adjusted under 35 U.S.C. 154(b) by 0 days.

(21) Appl. No.: 16/815,412

(22) Filed: Mar. 11, 2020

(51) Int. Cl.
  *H04N 21/23* (2011.01)
  *H04N 21/43* (2011.01)
  (Continued)

(52) U.S. Cl.
  CPC ..... *H04N 21/4307* (2013.01); *H04N 21/4524* (2013.01); *H04N 21/47202* (2013.01);
  (Continued)

(58) Field of Classification Search
  None
  See application file for complete search history.

(56) References Cited

U.S. PATENT DOCUMENTS 7,346,698 B2   3/2008   Hannaway
8,739,234 B1 * 5/2014   Cheung ............. H04L 29/08306
                                                              725/97
(Continued)

FOREIGN PATENT DOCUMENTS

CN   105245977   1/2016

OTHER PUBLICATIONS

Lauijssen, et al., "Low-cost synchronization of high-speed audio and video recordings in bio-acoustic experiments," The Journal of experimental biology (2018) 221, jeb173724. doi: 10.1242/jeb.173724.

(Continued)

*Primary Examiner* — Eileen M Adams
(74) *Attorney, Agent, or Firm* — Vierra Magen Marcus LLP

(57) ABSTRACT

Systems and methods for synchronizing video streams from multiple sources are described. The sources may comprise electronic devices, such as mobile phones and wireless cameras, that capture digital video recordings from different locations and transfer the digital video recordings to a server. The server may acquire a plurality of video recordings from the electronic devices, determine timing transitions that identify when each video recording of the plurality of video recordings was started and stopped, determine a common time duration for the plurality of video recordings based on the timing transitions, insert video content into one or more of the plurality of video recordings in order to equalize the video recording durations to the common time duration, and transmit a plurality of video-on-demand (VOD) files corresponding with the plurality of video recordings subsequent to equalization of the video recording durations.

15 Claims, 11 Drawing Sheets

(51) Int. Cl.
*H04N 21/845* (2011.01)
*H04N 21/472* (2011.01)
*H04N 21/45* (2011.01)
*H04N 21/8547* (2011.01)

(52) U.S. Cl.
CPC ... *H04N 21/47217* (2013.01); *H04N 21/8456* (2013.01); *H04N 21/8547* (2013.01)

(56) References Cited

U.S. PATENT DOCUMENTS

| | | | |
|---|---|---|---|
| 2010/0208082 A1* | 8/2010 | Buchner | H04N 21/4316 348/207.1 |
| 2010/0316349 A1* | 12/2010 | Nagano | G11B 27/034 386/230 |
| 2018/0184138 A1* | 6/2018 | Shaw | H04N 21/242 |
| 2018/0262892 A1* | 9/2018 | Kato | H04N 5/23245 |
| 2019/0130931 A1* | 5/2019 | Costa | G10L 21/10 |

OTHER PUBLICATIONS

Shrestha, et al., "Synchronization of Multiple Camera Videos Using Audio-Visual Features," IEEE Transactions on Multimedia, vol. 12, pp. 79-92, Jan. 2010.

\* cited by examiner

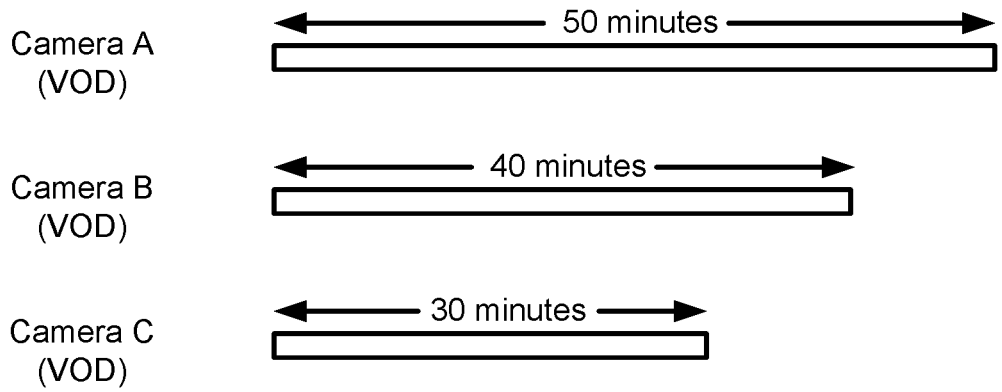
FIG. 2C
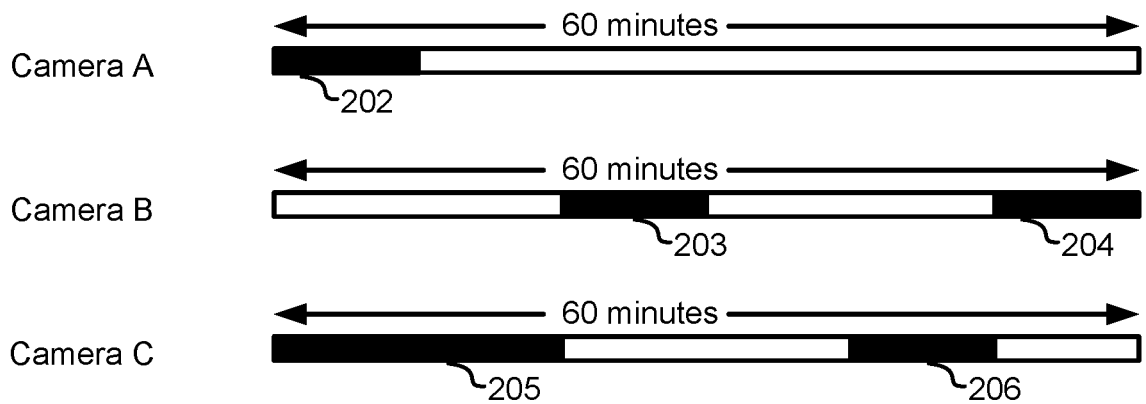
FIG. 2D
FIG. 2E

SYNCHRONIZATION OF MULTIPLE VIDEO-ON-DEMAND STREAMS AND METHODS OF BROADCASTING AND DISPLAYING MULTIPLE CONCURRENT LIVE STREAMS

BACKGROUND

The present disclosure relates to systems and methods for synchronizing video streams from multiple sources.

Portable electronic devices, such as mobile phones and tablet computers, often employ camera technologies capable of recording digital images and videos. The proliferation of portable electronic devices combined with the ability to cheaply capture digital videos has allowed electronic device users to capture and share more life experiences than was previously feasible. As an example, spectators attending an event, such as a soccer game or a music concert, may capture live videos of the event using their mobile phones and then share the videos with others over the Internet. The ability to acquire video recordings from other portable electronic devices at the event allows electronic device users to acquire and view different perspectives or angles of the event in real-time.

BRIEF DESCRIPTION OF THE DRAWINGS

Aspects of the present disclosure are illustrated by way of example and are not limited by the accompanying figures with like references indicating like elements.

FIG. 2C depicts one embodiment of three VOD files corresponding with the three video recordings displayed in FIG. 2B.

FIG. 2D depicts one embodiment of timing metadata for the three VOD files depicted in FIG. 2C.

FIG. 2E depicts one embodiment of three VOD files corresponding with the three video recordings displayed in FIG. 2B after VOD file equalization.

DETAILED DESCRIPTION

Figure 1:
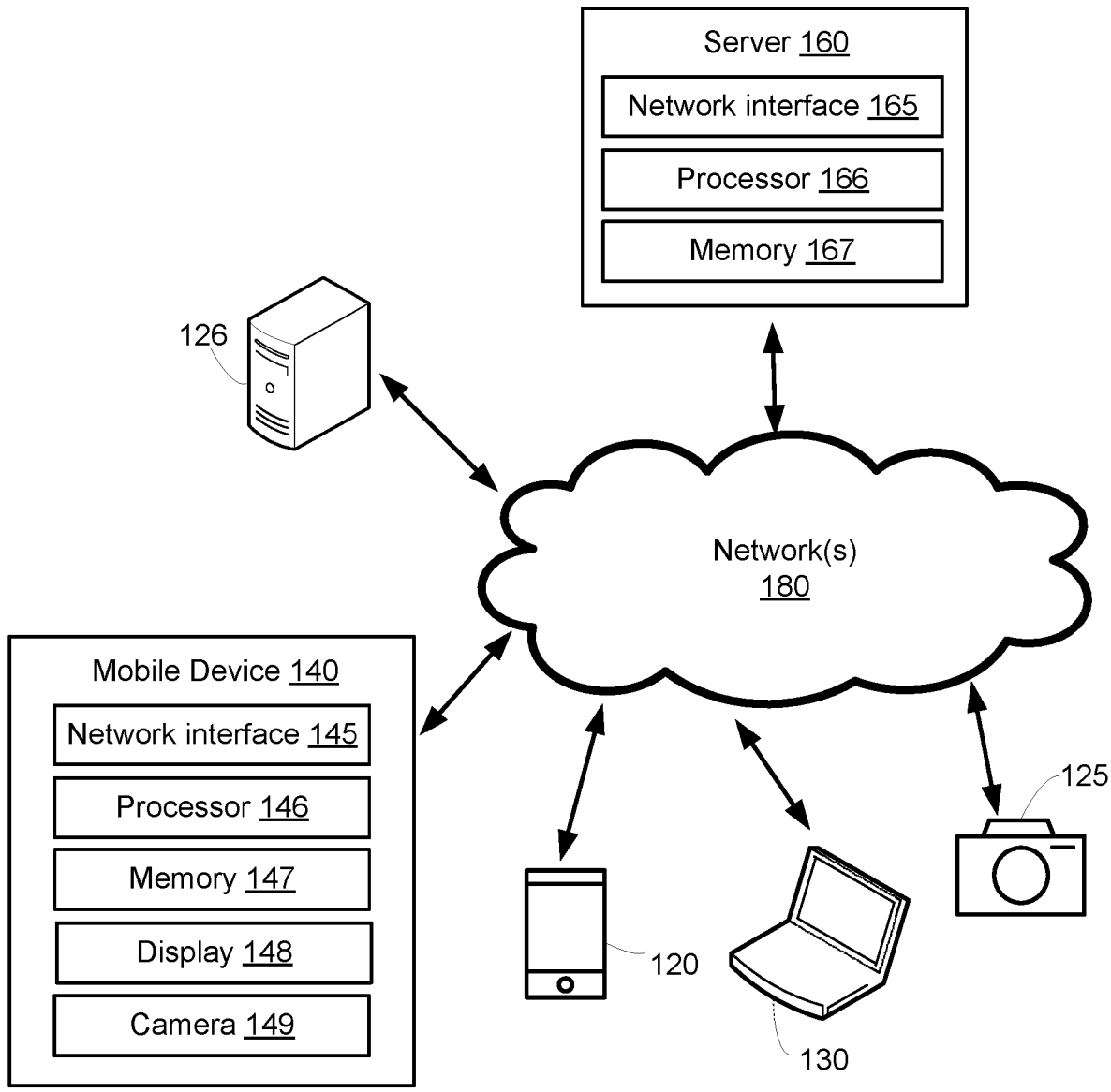
FIG. 1 is a block diagram of one embodiment of a networked computing environment.

Technology is described for synchronizing video streams from multiple sources. The sources may comprise portable electronic devices, such as mobile phones, standalone cameras, and tablet computers, that capture digital video recordings from different locations and transfer the digital video recordings to a server. The portable electronic devices may live stream digital video, such as video of a sporting event as the event is occurring. Live video streaming may refer to the delivery of digital video to servers and/or computing devices in near real-time such that an end user of a first computing devices may view the digital video with a small delay (e.g., a few seconds) between the capturing of the digital video using a second computing device and the displaying of the digital video using the first computing device. In some cases, a multi-source video streaming application may allow an end user of an electronic device (e.g., a smartphone) to transfer digital video captured by the electronic device to a server and to receive one or more video streams from the server that derive from other electronic devices that may be displayed using the electronic device. The end user may live stream a digital video captured using the electronic device and/or receive one or more live video streams from the other electronic devices. Each of the one or more video streams from the other electronic devices may correspond with video recordings of different angles or points of view of an event.

In some embodiments, a server may acquire a plurality of video recordings, determine timing transitions for each of the plurality of video recordings that identify when each video recording was started and stopped, determine a common duration for the plurality of video recordings based on the timing transitions, insert video content into one or more of the plurality of video recordings in order to equalize or synchronize the video recording durations to the common duration, and transmit or display a plurality of video-on-demand (VOD) files corresponding with the plurality of video recordings.

In some embodiments, a portable electronic device may acquire a plurality of video recordings from a server, identify start and stop times for each of the plurality of video recordings, determine a common duration for the plurality of video recordings using the start and stop times for each of the plurality of video recordings, insert sets of video content into one or more of the plurality of video recordings in order to equalize the video recording durations to the common duration, and display one or more of the plurality of video recordings subsequent to equalization of the video recording durations. The plurality of video recordings may correspond with a plurality of VOD files.

One technical issue with receiving and synchronizing a plurality of video recordings (e.g., comprising different video-on-demand VOD files) from other electronic devices is that each of the plurality of video recordings may correspond with a different video recording duration caused by different video stream start times, different video stream stop times, and/or pausing of the video streams. The stopping or pausing of a video stream may be due to signal loss from an originating camera, networking failures, or an end user temporarily pausing transmission of the video stream. The different video recording durations or lengths may make it difficult to synchronize the plurality of video recordings for viewing. One technical benefit of identifying and filling video recording gaps in order to equalize video recording duration is that the plurality of video recordings may be properly synchronized. In some cases, the video recording gap filling may be performed by a server prior to transmitting the plurality of video recordings to an end user's electronic device. In other cases, the video recording gap filling may be performed by an end user's electronic device locally after receiving a subset of the plurality of video recordings.

One technical issue with synchronizing a plurality of video recordings is that the time delays between when the video recordings were captured and when the video recordings are received at a server may vary depending on networking bandwidth and distance between an electronic device capturing a video recording and the server. One technical benefit of identifying and compensating for variability in video recording arrival times at the server is that the plurality of video recordings may be properly synchronized to enable consistent viewing of the plurality of video recordings as an end user of an electronic device switches between different video recordings at the same point in time. The end user may adjust a slide bar or a seek bar in order to specify a particular point in time to play a subset of the video recordings.

One technical issue with synchronizing a plurality of live video streaming broadcasts associated with a particular broadcast group is that unless there is a common tie between the different broadcasts, it may be unclear how to display the plurality of live video streaming broadcasts on separate display screens. In some cases, an end user of a mobile device may send a request to join a particular broadcast group. The particular broadcast group may be identified using a group identifier, a group leader identifier, a username, or an event identifier that was generated and shared by a leader of the particular broadcast group. The leader or an administrative user associated with the particular broadcast group may then accept or reject the request to join the particular broadcast group, thereby controlling the plurality of live video streaming broadcasts associated with the particular broadcast group. In some cases, each live video broadcast that is associated with an identifier for the particular broadcast group and has been accepted for display may be displayed using the same screen.

FIG. 1 is a block diagram of one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile smartphone 120, camera 125, desktop computer 126, laptop computing device 130, mobile device 140, and server 160. The camera 125 may comprise a Real-Time Messaging Protocol (RTMP) camera or a standalone camera with wireless connectivity. The mobile device 140 may comprise a mobile computing device such as a mobile phone, smart device (e.g., a smartphone or a smart camera with wireless connectivity), or tablet computer. In some embodiments, the plurality of computing devices may include other computing devices not shown. The computing devices may comprise mobile computing devices and non-mobile computing devices (e.g., a desktop computer or a smart television). In some embodiments, the plurality of computing devices may include more than or less than the number of computing devices depicted in FIG. 1. The one or more networks 180 may include a secure network such as an enterprise private network, an unsecure network such as a wireless open network, a local area network (LAN), a wide area network (WAN), or the Internet. The one or more networks 180 may include a cellular network, a mobile network, or a wireless network. Each network of the one or more networks 180 may include hubs, bridges, routers, switches, and wired transmission media such as a wired network or direct-wired connection.

One embodiment of mobile device 140 includes a network interface 145, processor 146, memory 147, display 148, and camera 149, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, or Flash). Memory 147 may comprise a hardware storage device. Display 148 may comprise a touch-screen display. Camera 149 may include an image sensor for capturing images. Camera 149 may capture color images of an environment. The camera 149 may comprise an image capturing device for capturing one or more images of an environment or an object within the environment. The mobile device 140 may include outward facing cameras that capture images of the environment and/or inward facing cameras that capture images of the end user of the mobile device.

In some cases, the server 160 may comprise a server within a data center. The data center may include one or more servers, such as server 160, in communication with one or more storage devices. The servers and data storage devices within a data center may be in communication with each other via a networking fabric connecting server data storage units within the data center to each other. One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Memory 167 may comprise a hardware storage device.

In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

Networked computing environment 100 may provide a cloud computing environment for one or more computing devices. Cloud computing may refer to Internet-based computing, wherein shared resources, software, and/or information are provided to one or more computing devices on-demand via the Internet (or other global network). The term "cloud" may be used as a metaphor for the Internet, based on the cloud drawings used in computer networking diagrams to depict the Internet as an abstraction of the underlying infrastructure it represents.

In some embodiments, a server, such as server 160, may act as an aggregation server for receiving a plurality of video recordings from a plurality of mobile computing devices. The server may execute a multi-source video streaming application that identifies and fills video recording gaps prior to transmission of the plurality of video recordings. In one example, the server 160 may receive a first video stream from a first mobile computing device during an event and may receive a second video stream from a second mobile computing device during the event. The server 160 may insert a first set of video content into a first video recording for the first video stream and insert a second set of video content into a second video recording for the second video stream in order to equalize the video recording duration for both the first video recording and the second video recording. In some cases, the server 160 may receive hundreds of live video streams of the event while the event is occurring and the server 160 may equalize the video recording duration for only a subset of video recordings that are to be transferred to an end user's mobile computing device. For example, the server 160 may equalize the video recording duration for five VOD files to be transferred to the end user's mobile computing device.

Figure 2A:
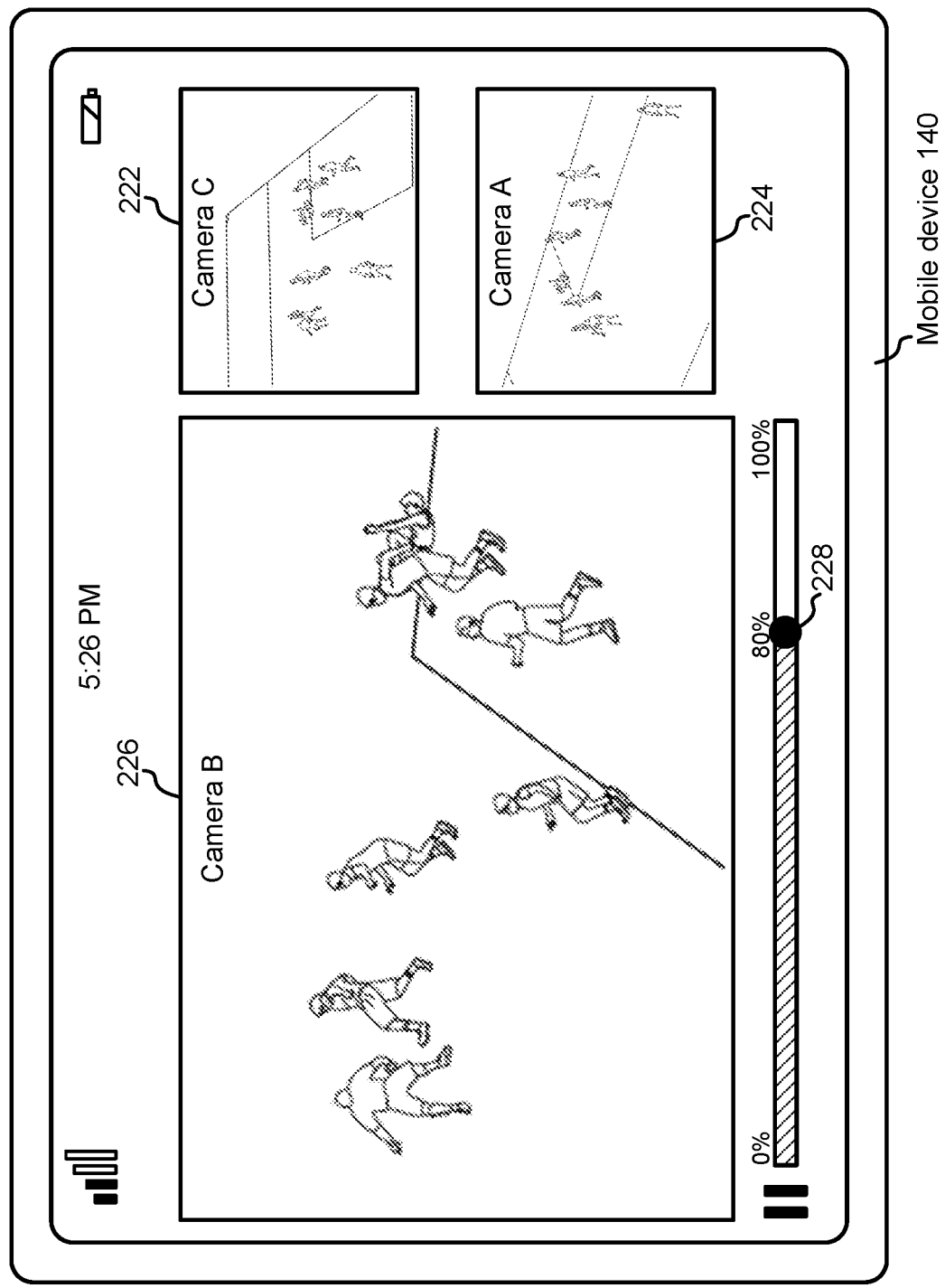
FIG. 2A depicts one embodiment of a mobile device displaying a plurality of video recordings.

FIG. 2A depicts one embodiment of the mobile device 140 in FIG. 1 displaying a plurality of video recordings. The plurality of video recordings includes a first video recording 224 corresponding with Camera A, a second video recording 226 corresponding with Camera B, and a third video recording 222 corresponding with Camera C. The three cameras (Camera A, Camera B, and Camera C) may correspond with three different mobile computing devices that captured video recordings of a sporting event. The seek bar may be displayed with a percentage-based reference and the seek bar control 228 may be adjusted such that the point in time associated with 80% of the video recording duration is displayed. In some cases, the images and videos depicted in FIG. 2A being displayed using mobile device 140 may be displayed using a desktop computer, a laptop computer, a tablet computer, or a smart/connected television.

In some cases, media player plugins used for playing back VOD files may use a percentage (%) scale for time duration and for the determination of where each frame is in a video recording regardless of whether a time scale is displayed. This means that when an end user of a mobile device has a one-hour video recording and has watched 48 minutes out of the 60 minutes for the video recording, the media player plugin may actually consider the video recording to be at the 80% mark even if the time displayed is the 48 minute mark. If the end user adjusts the video recording using the seek bar to fast forward or rewind the video recording, then the media player plugin will calculate the percentage to move to before updating the displayed portion of the video recording. In a non-synchronized system in which video recording durations are not equalized, this may be problematic because 80% of a first video recording may correspond with 10:48 AM while 80% of a second video recording may correspond with a different time of 10:51 AM. Identifying and filling in video recording gaps in order to equalize video recording duration for VOD files may allow the VOD files to be properly synchronized such that the 80% mark always maps to 10:48 AM.

As depicted in FIG. 2A, an end user of the mobile device 140 may adjust the seek bar control 228 such that video recordings of a prior point in time are displayed. In one example, the end user of the mobile device 140 may adjust the seek bar control 228 in order to replay an event that occurred in the past. In this case, the primary video recording corresponding with the second video recording 226 consumes the largest display area compared with the secondary video recordings corresponding with the first video recording 224 and the third video recording 222. As the three video recordings have been synchronized, the end user of the mobile device 140 may concurrently view the three video recordings at the same point in time.

In some embodiments, the bandwidth allocated to the secondary video recordings corresponding with the first video recording 224 and the third video recording 222 may be adjusted over time or reduced in order to maintain a threshold bandwidth for displaying the primary video recording corresponding with the second video recording 226. In some cases, if the threshold bandwidth for the primary video recording cannot be maintained, then the display size of the secondary video recordings may be reduced (e.g., by 2x) and the bandwidth allocated to the secondary video recordings may be reduced (e.g., by 4x). In some cases, if the threshold bandwidth for the primary video recording cannot be maintained, then the number of secondary video recordings may be reduced (e.g., the third video recording 222 may not be displayed as a video or may be represented using a still image). In one example, if the threshold bandwidth for displaying the primary video recording cannot be maintained, then the number of secondary video recordings displayed may be cut in half (e.g., from displaying four secondary video recordings to displaying two secondary video recordings).

In some embodiments, if the mobile device 140 cannot display the primary video recording at a particular bandwidth or a particular frame rate (e.g., at 60 frames per second), then the resolution of the images or videos used for displaying the secondary video recordings may be reduced (e.g., cut in half). In some embodiments, if the mobile device 140 cannot display the primary video recording with at least the particular bandwidth or frame rate, then the mobile device 140 may communicate with a server, such as server 160, that is transmitting the secondary video recordings to the mobile device 140 to reduce the video resolution or the frame rate for the secondary video recordings being transmitted to the mobile device 140. In some embodiments, if the mobile device 140 cannot display the primary video recording with at least the particular bandwidth or frame rate, then the mobile device 140 may reduce the video resolution or reduce the frame rate for the displayed secondary video recordings. In one example, the frame rate for displaying the secondary video recordings may be reduced from 60 frames per second to 15 frames per second.

In some embodiments, an end user of the mobile device 140 may customize user-configurable display settings to configure the number of secondary video recordings to be displayed (e.g., whether two or four secondary video recordings are to be displayed), which secondary video recordings are displayed (e.g., selecting two particular secondary video recordings out of 120 possible video recordings to be displayed), and the display location and size of the secondary video recordings that are displayed using the mobile device 140. An end user of the mobile device 140 may configure a multi-stream display to include one primary video recording and one or more secondary video recordings. It should be noted that although FIG. 2A depicts the display of two secondary video recordings, the display of mobile device 140 may be configured to display one or more secondary video recordings at the same time (e.g., to concurrently display four secondary video recordings 222, 224, 242, and 244 along with a primary video recording). In one example, a first end user of a first mobile device may configure their multi-stream display to include one primary video recording 226 and two secondary video recordings 222 and 224 that are arranged in a manner such as the video recordings depicted in FIG. 2A and a second end user of a second mobile device may configure their multi-stream display to include one primary video recording 226 and two secondary video recordings 242 and 244 that are arranged in a manner such as the video recordings depicted in FIG. 2I. The end user may also specify a threshold frames per second for both the primary video recording (e.g., at least 60 frames per second) and the secondary video recordings (e.g., at least 15 frames per second).

Figure 2B:
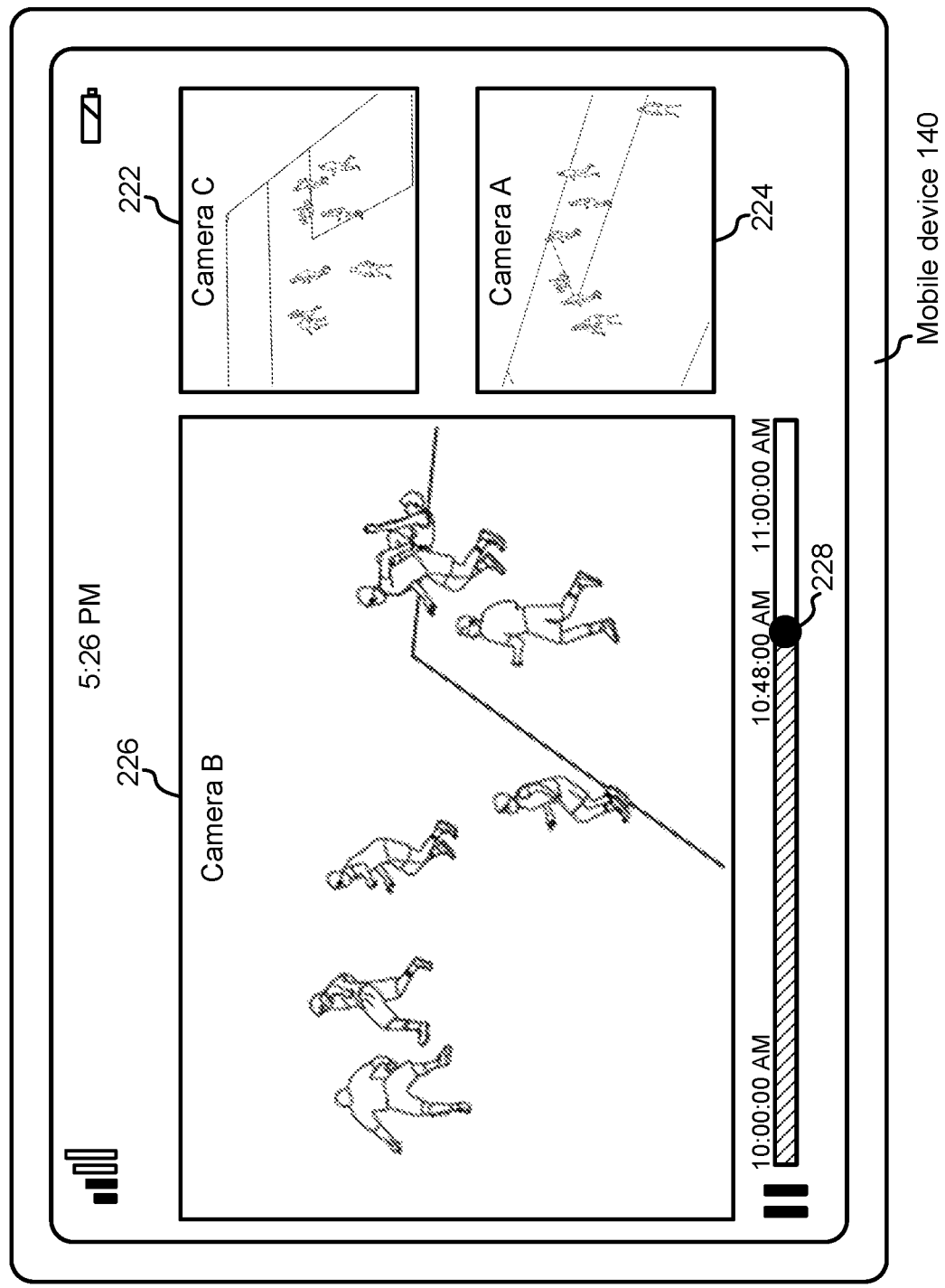
FIG. 2B depicts one embodiment of a mobile device displaying a plurality of video recordings and displaying a seek bar with a time-based reference.

FIG. 2B depicts one embodiment of mobile device 140 displaying the plurality of video recordings and displaying a seek bar with a time-based reference. In some cases, the end user of the mobile device 140 may set the type of reference for the seek bar via configuration settings for the display of the video recordings.

In one embodiment, the mobile device 140 may acquire three video-on-demand (VOD) files for the three video recordings. The three VOD files may comprise files of different file sizes and of different recording time durations. In one example, a first VOD file for the first video recording 224 may comprise a 50 minute duration, a second VOD file for the second video recording 226 may comprise a 40 minute duration, and a third VOD file for the third video recording 222 may comprise a 30 minute duration. The mobile device 140 may acquire timing metadata for the three video recordings from a server. Using the timing metadata, the mobile device 140 may identify the earliest start time (or the earliest connect time) for the three video recordings, identify the latest stop time (or the latest disconnect time) for the three video recordings, and identify recording gaps in the three video recordings. The mobile device 140 may then equalize the video recording durations for the three VOD files by adding video content to the three VOD files.

FIG. 2C depicts one embodiment of three VOD files corresponding with the three video recordings displayed in FIG. 2B. Although video recordings using a VOD file format are depicted, other video recording formats (e.g., an MPEG file format) may also be used for storing the video recordings. As depicted in FIG. 2C, the VOD file for the first video recording 224 (Camera A) comprises a 50 minute duration, the VOD file for the second video recording 226 (Camera B) comprises a 40 minute duration, and the VOD file for the third video recording 222 (Camera C) comprises a 30 minute duration.

FIG. 2D depicts one embodiment of timing metadata for the three VOD files depicted in FIG. 2C. For the first video recording 224 (Camera A), the video recording connected at 10:10 AM and then disconnected at 11:00 AM. For the second video recording 226 (Camera B), the video recording connected at 10:00 AM, disconnected at 10:20 AM, reconnected at 10:30 AM, and then disconnected at 10:50 AM. For the third video recording 222 (Camera C), the video recording connected at 10:20 AM, disconnected at 10:40 AM, reconnected at 10:50 AM, and then disconnected at 11:00 AM. A video recording may be classified as being disconnected due to loss of connection between a server and a camera or if the video recording has been paused. A video recording may be classified as connected if video content is being received by a server from a camera (or a mobile computing device that includes the camera).

FIG. 2E depicts one embodiment of the three VOD files corresponding with the three video recordings displayed in FIG. 2B after VOD file equalization. As the earliest start time for the three video recordings comprised 10:00 AM and the latest stop time for the three video recordings comprised 11:00 AM, the duration for the three VOD files was set to one hour. Furthermore, in order to equalize the time duration for the three VOD files to be one hour, a first set of video content 202 was added to the VOD file for the first video recording 224 (Camera A), a second set of video content 203 and 204 was added to the VOD file for the second video recording 226 (Camera B), and a third set of video content 205 and 206 was added to the VOD file for the third video recording 222 (Camera C). After the time duration for the three VOD files has been equalize, each of the three VOD files comprises 60 minutes of video recording.

In one embodiment, the first set of video content 202 may comprise a white noise video, a black screen, or any other inserted video such as advertising or other camera signals. In another embodiment, the first set of video content 202 may comprise a portion of the video recording from the second video recording 226 with a notification overlay displaying that the video was taken from Camera B; in this case, if the end user of a mobile device selects to view Camera A at the beginning of the video recording (e.g., at 10:00 AM), then the mobile device will display the portion of the second video recording 226 with the notification overlay. In another embodiment, the first set of video content 202 may comprise a portion of a video recording from the camera with the closest proximity to Camera A; in this case, location information (e.g., GPS location information) may be used to identify the camera that is closest to Camera A.

In one embodiment, the second set of video content 203 may comprise a video recording that displays a blank screen or displays a notification that video is not available for the selected point in time. In another embodiment, the second set of video content 203 may comprise a portion of the video recording from the first video recording 224 with a notification overlay displaying that the video was taken from Camera A; in this case, if the end user of a mobile device selects to view Camera B at time 10:25 AM, then the mobile device will display the portion of the first video recording 224 with the notification overlay that identifies that the video was taken from Camera A.

Figure 2F:
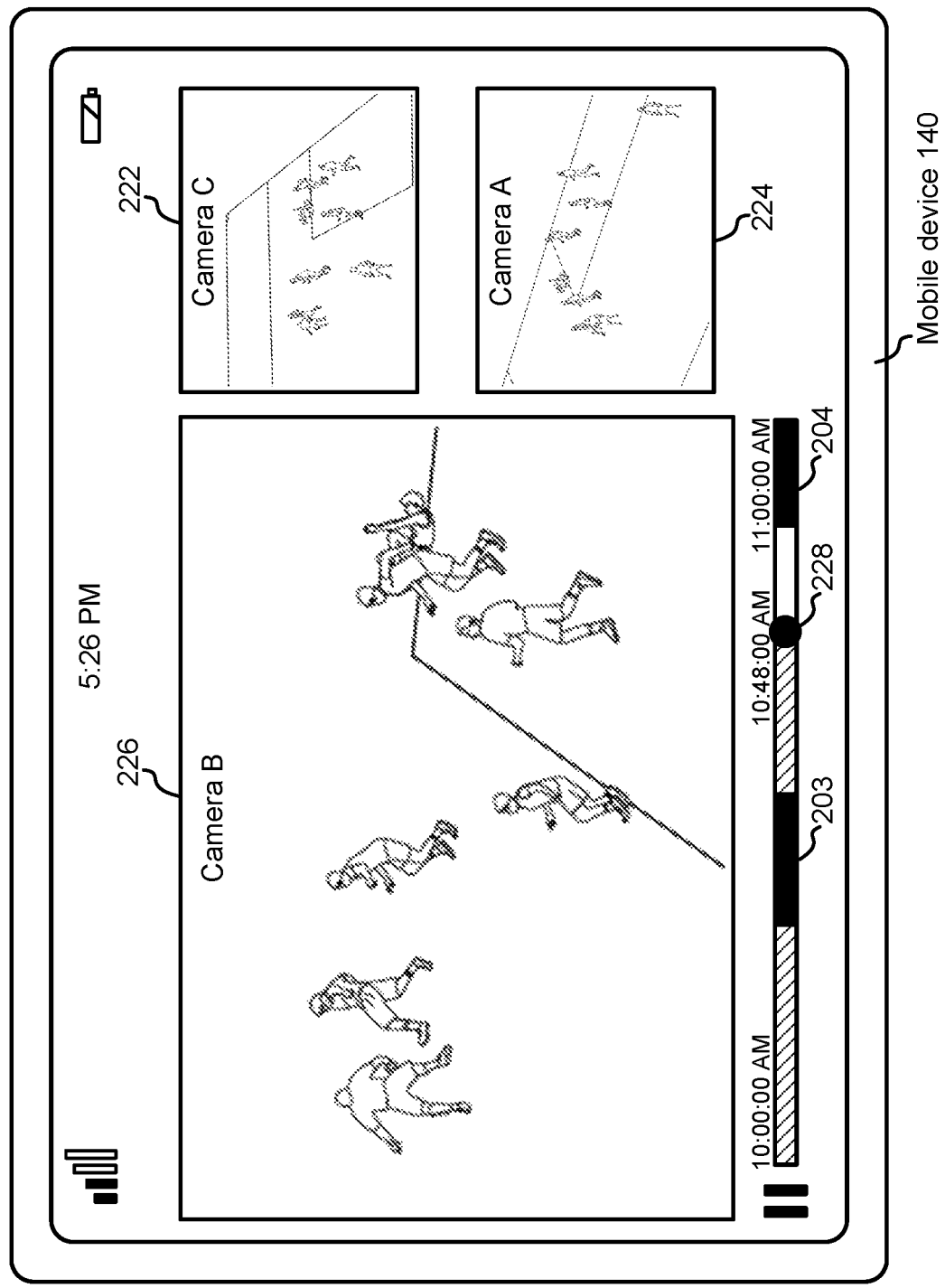
FIG. 2F depicts one embodiment of a mobile device displaying a plurality of video recordings and displaying a seek bar that shows which portions of a second video recording have been gap filled.

FIG. 2F depicts one embodiment of mobile device 140 displaying a plurality of video recordings and displaying a seek bar that shows which portions of the second video recording 226 have been gap filled. As depicted, video content 203 and video content 204 have been added to the second video recording 226 in order to equalize the duration of the three video recordings.

Figure 2G:
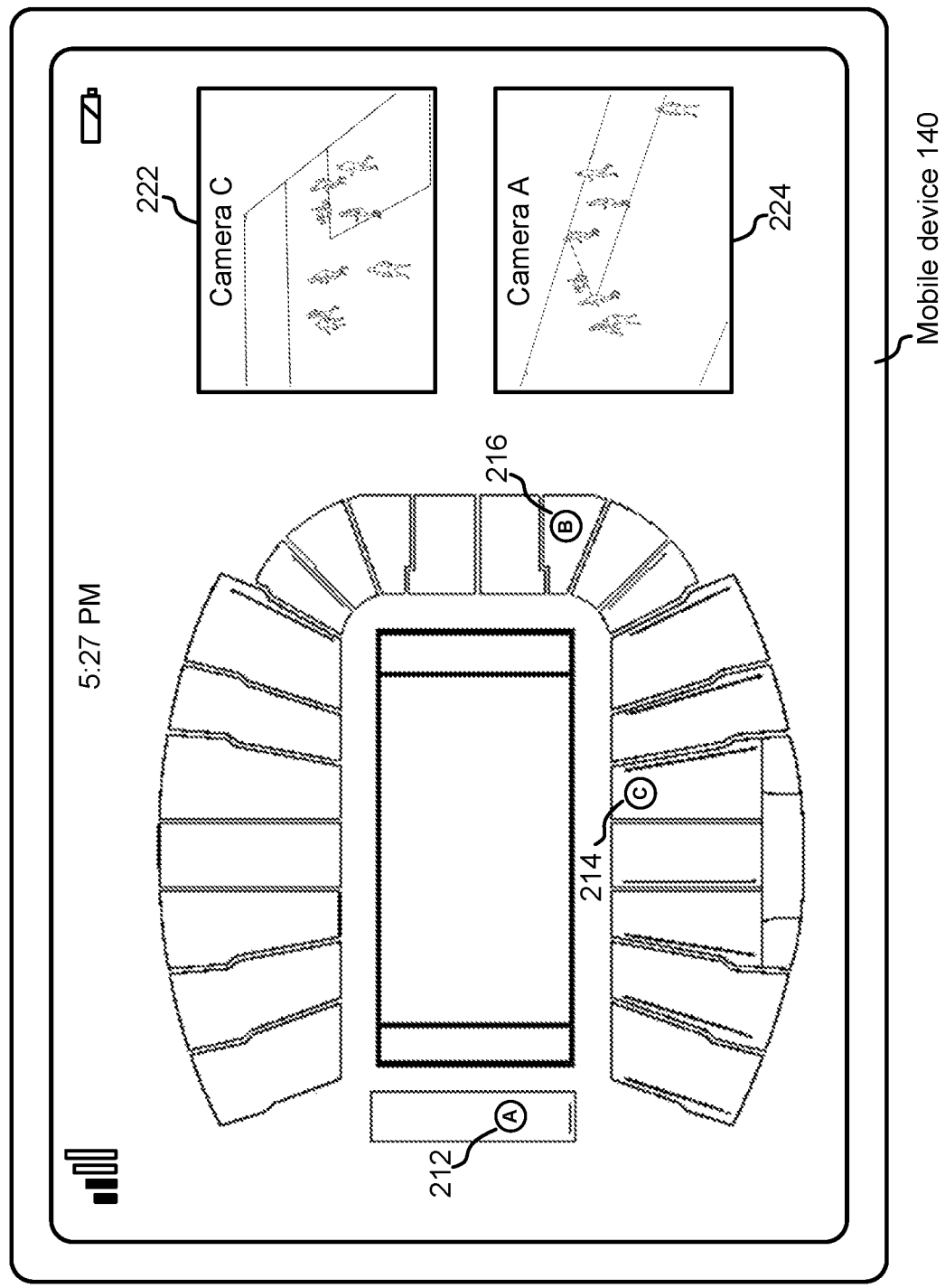
FIG. 2G depicts one embodiment of a mobile device displaying a map of a venue.

FIG. 2G depicts one embodiment of mobile device 140 displaying a map of a venue (e.g., a stadium) with camera locations corresponding with the three video recordings displayed in FIG. 2B. In this case, the first video recording 224 (Camera A) has been captured at location 212 within the venue, the third video recording 222 (Camera C) has been captured at location 214 within the venue, and the second video recording 226 (Camera B) has been captured at location 216 within the venue. An end user of the mobile device 140 may select which video recordings are displayed on the mobile device 140 by selecting the corresponding camera locations using the touchscreen display. Although the capturing of three different views of an event is depicted in FIG. 2G, a plurality of captured views (e.g., thousands of different views from thousands of different cameras) may be aggregated and a subset of the plurality of captured views (e.g., ten video recordings) may be transmitted to a mobile device, such as mobile device 140 in FIG. 1, for display on the mobile device. Out of the subset of the plurality of captured views acquired by the mobile device, one video out of the subset may be expanded to be viewed as a full screen video while the others are displayed using thumbnail-sized videos or images. The video displayed using a full screen view or an enlarged view may comprise a primary video recording, such as the second video recording 226, and the other videos displayed using thumbnail-sized videos or still images may comprise secondary video recordings, such as the first video recording 224 and the third video recording 222.

Figure 2H:
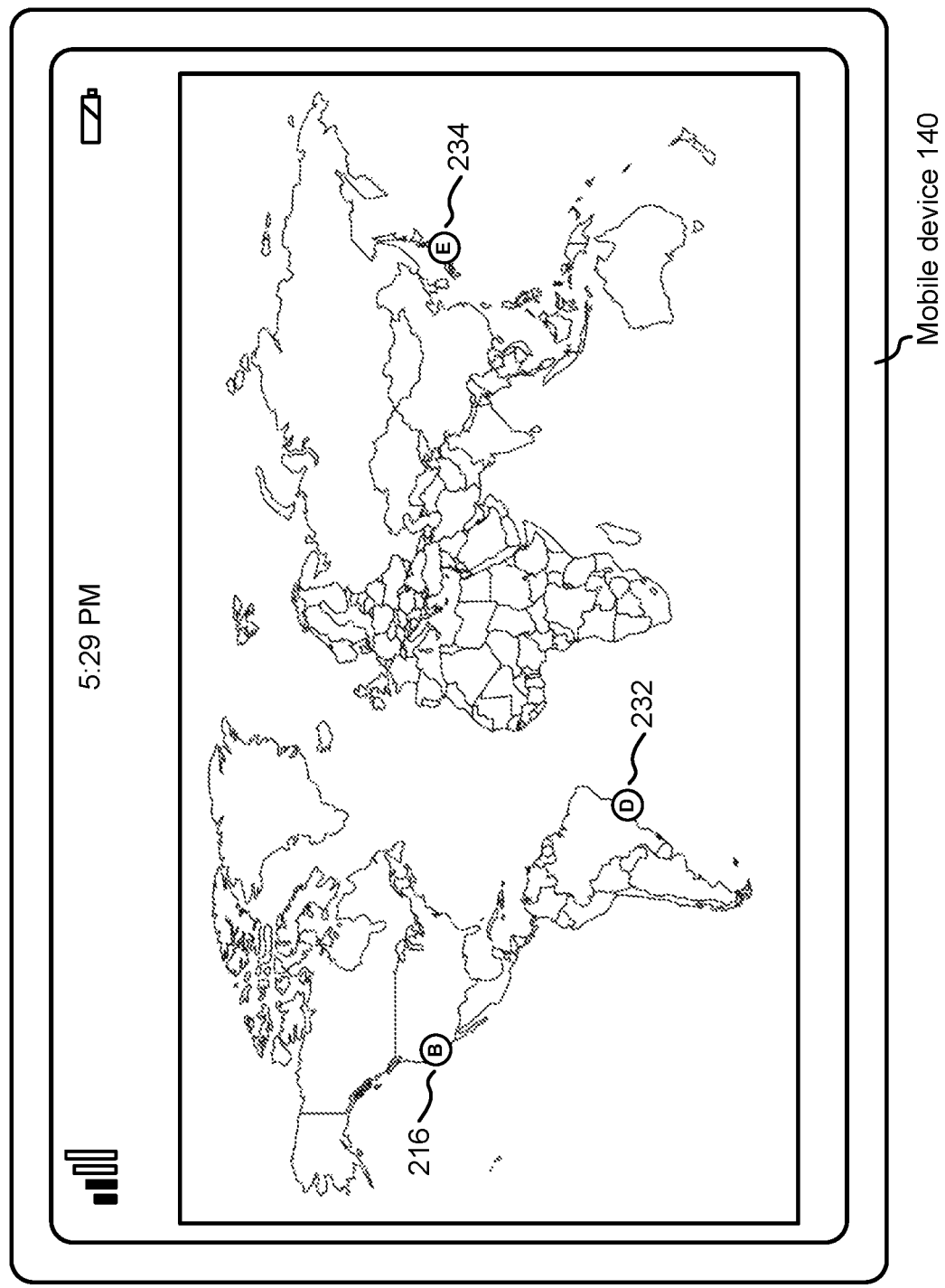
FIG. 2H depicts one embodiment of a mobile device displaying a map of the world with camera locations corresponding with the three video recordings displayed in FIG. 2B.

FIG. 2H depicts one embodiment of mobile device 140 displaying a map of the world with camera locations corresponding with the three video recordings displayed in FIG. 2B. In this case, the second video recording 226 (Camera B) has been captured at location 216, a fourth video recording (Camera D) has been captured at location 232, and a fifth video recording (Camera E) has been captured at location 234.

Figure 2I:
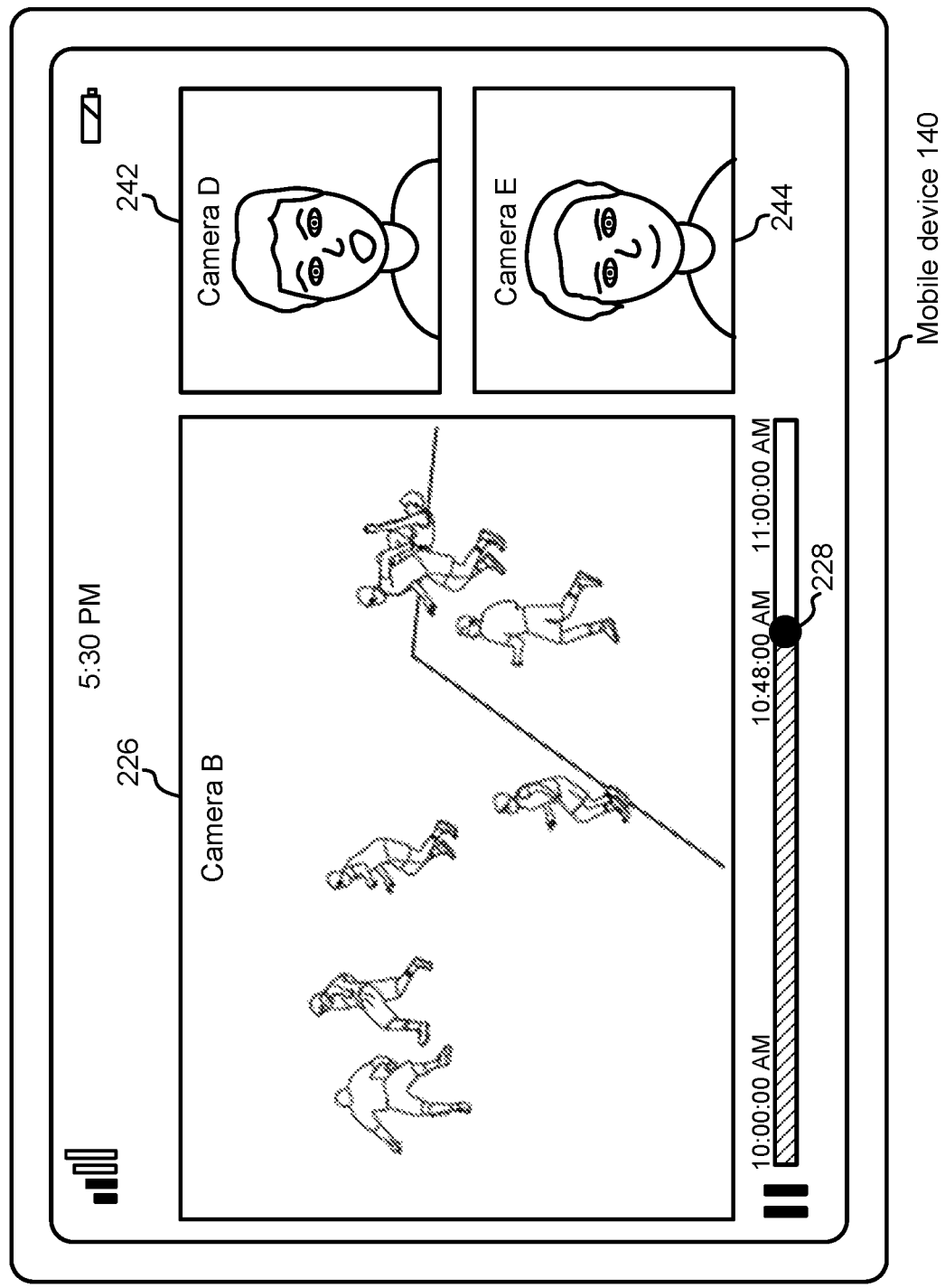
FIG. 2I depicts one embodiment of a mobile device displaying three video recordings different from the three video recordings depicted in FIG. 2B.

FIG. 2I depicts one embodiment of mobile device 140 displaying three video recordings different from the three video recordings depicted in FIG. 2B. In this case, an end user of the mobile device 140 may have selected the fourth video recording 242 (Camera D) captured at location 232 in FIG. 2H and selected the fifth video recording 244 (Camera E) captured at location 234 in FIG. 2H. The fourth video recording 242 (Camera D) may correspond with a person viewing a sporting event away from the venue hosting the sporting event. At the point in time associated with 10:48:00 AM (or 80% of the video recording duration), the end user may select to view Camera A, Camera B, and Camera C as depicted in FIG. 2A or the end user may select to view Camera B, Camera D, and Camera E as depicted in FIG. 2I.

Figure 3A:
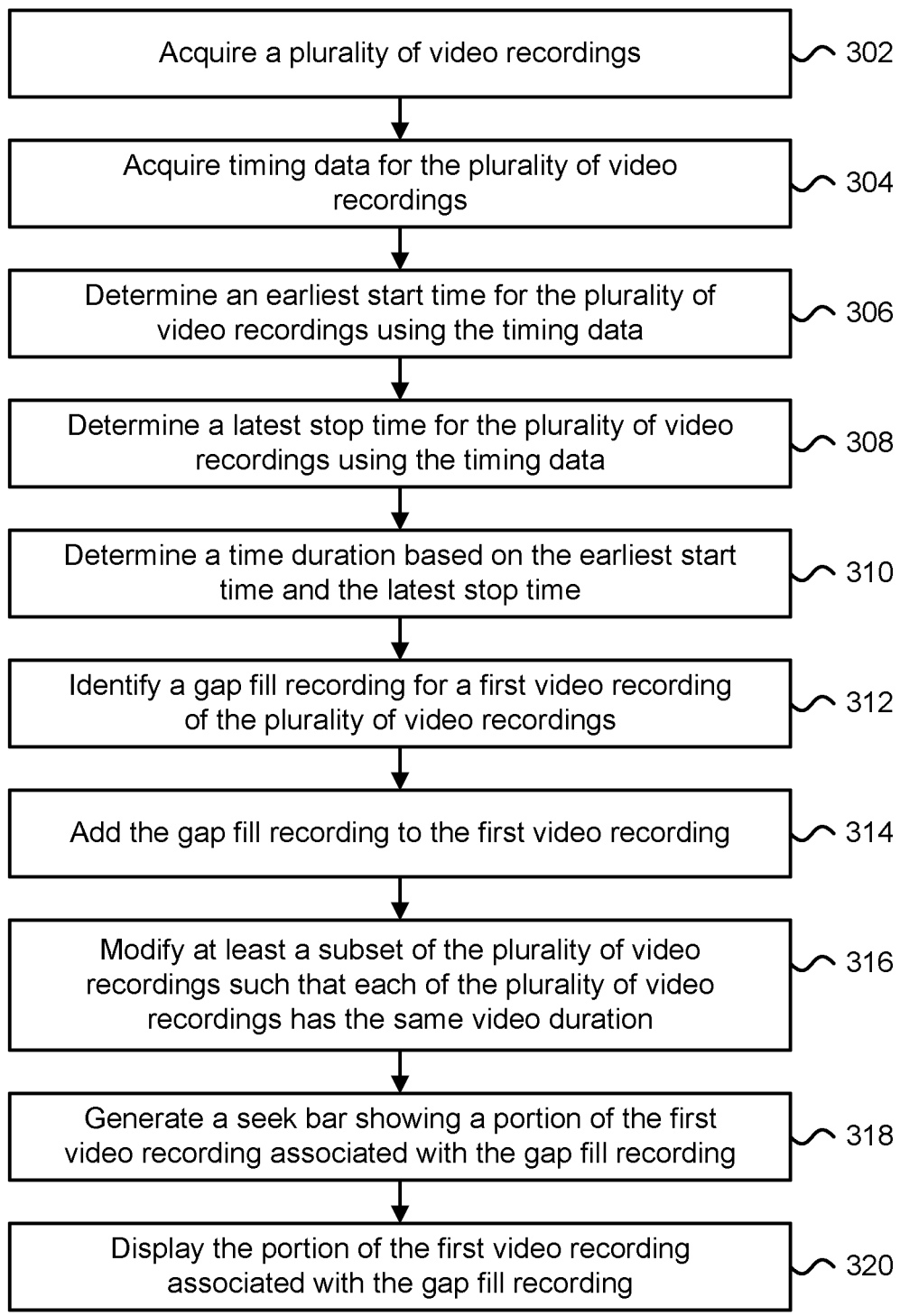
FIG. 3A is a flowchart describing one embodiment of a process for synchronizing and displaying multiple video streams using a computing device.

FIG. 3A is a flowchart describing one embodiment of a process for synchronizing and displaying multiple video streams using a computing device. The computing device may comprise a mobile computing device. In one embodiment, the process of FIG. 3A may be performed by a mobile computing device, such as mobile device 140 in FIG. 1. In another embodiment, the process of FIG. 3A may be performed by a server, such as server 160 in FIG. 1.

In step 302, a plurality of video recordings is acquired. In one example, the plurality of video recordings may correspond with video streams transferred to a server in communication with a plurality of portable electronic devices that captured the plurality of video recordings. In this case, the server may equalize the video recording duration for the plurality of video recordings prior to transferring the plurality of video recordings to an end user's mobile computing device. In another example, the plurality of video recordings may be transferred from a server to an electronic device used by an end user for displaying video recordings. In step 304, timing data for the plurality of video recordings is acquired. In one example, the timing data may comprise transition times (e.g., when a video stream was started or stopped). The transition times may be specified using Coordinated Universal Time (UTC) real time. The transition times may dictate when a video stream has been received by a server and when a disconnection has occurred such that video content is not received by the server. One example of timing data comprises the timing metadata depicted in FIG. 2D.

In step 306, an earliest start time for the plurality of video recordings is determined using the timing data. The earliest start time may comprise the earliest time at which a video recording was received at a server. In step 308, a latest stop time for the plurality of video recordings is determined using the timing data. The latest stop time may comprise the latest time at which a video recording was received at a server. In reference to FIG. 2D, the earliest start time for the three video recordings was 10:00 AM and the latest stop time for the three video recordings was 11:00 AM. In step 310, a time duration is determined based on the earlier start time and the latest stop time. The time duration may comprise the latest stop time minus the earlier start time. In reference to FIG. 2D, if the earliest start time for the three video recordings was 10:00 AM and the latest stop time for the three video recordings was 11:00 AM, then the time duration may be set to the time difference between the earliest start time and the latest stop time or one hour.

In step 312, a gap fill recording fora first video recording of the plurality of video recordings is identified. The gap fill recording may be used to fill in video recording gaps in the first video recording in order to increase the time duration of the first video recording to the time duration determined in step 310. The gap fill recording may be added to the beginning of the first video recording, to the ending of the first video recording, or in the middle of the first video recording. In one example, the gap fill recording may comprise a dummy transition video recording or a black screen recording. In another example, the gap fill recording may comprise a portion of a second video recording of the plurality of video recordings different from the first video recording. In another example, the gap fill recording may correspond with the video content 203 in FIG. 2E. In step 314, the gap fill recording is added to the first video recording or inserted into the first video recording.

In step 316, at least a subset of the plurality of video recordings is modified such that each video recording of the plurality of video recordings has the same time duration. In one example, each video recording of the three video recordings depicted in FIG. 2E has been modified such that the time duration for each video recording is 60 minutes. The first video recording may be modified via insertion of the gap fill recording into the first video recording. In step 318, a seek bar (or player seek bar) showing a portion of the first video recording associated with the gap fill recording is generated. The seek bar may display a percentage-based reference or a timing-based reference. In step 320, the portion of the first video recording associated with the gap fill recording is displayed. In one example, the portion of the first video recording associated with the gap fill recording is displayed in response to detecting that the seek bar has been adjusted by an end user of a portable electronic device displaying the seek bar. The end user of the portable electronic device may use the seek bar to play the first video recording from either a particular percentage of the first video recording or from a particular point in time (e.g., from 10:48 AM).

In some embodiments, in order to convert from a real time (or timing-based reference) corresponding with a point in time dictated by an end user to a percentage (or percentage-based reference), an array for each video recording of the plurality of video recordings may be used to record a relative time for each start/stop video transition. The relative time may correspond with the time that has passed since the earliest start time (e.g., 48 minutes). The array may provide a mapping between the point in time (e.g., 10:48 AM) dictated by the end user and the appropriate seek bar percentage (e.g., 80%). In some cases, a relative time may be determined for each start/stop video transition that is relative to the earliest start time and the relative time may be used to facilitate synchronized playback of a video recording at the point in time dictated by the end user. In other cases, an absolute time may be determined for each start/stop video transition and the absolute time may be used to facilitate synchronized playback of a video recording at the point in time dictated by the end user.

In some embodiments, a server may acquire a first plurality of video recordings capturing video of an event and transfer a subset of the first plurality of video recordings to a portable electronic device used by an end user. The subset of the first plurality of video recordings may comprise less than all of the first plurality of video recordings. In this case, the determination of the earliest start time, the latest stop time, and the time duration may be made for the subset of the first plurality of video recordings and not made based on all of the first plurality of video recordings. The equalization of the time durations for each video recording of the subset of the first plurality of video recordings may allow the end user of the portable electronic device to watch multiple synchronized camera angles or multiple video recordings at the same time.

One issue with a server determining the connect times (or start times) and the disconnect times (or stop times) based on when a video recording is received at the server is that the amount of time between the capture and transmission of the video recording from a portable electronic device and the reception of the video recording at the server may vary substantially depending on networking bandwidth and data transmission rates between the portable electronic device and the server. The variation in delay may also be caused by variation in processor and memory performance across different portable electronic devices. For example, the time to perform video compression by the portable electronic device may vary based on CPU utilization and the type of compression performed.

The algorithms for synchronizing video recordings may utilize one or more time codes. In some cases, a time code may be generated and added to a transmitted video recording in order to reduce the variability in capture and arrival time for the video recording. The time code may be added as metadata to the video recording or may be overlaid or embedded within the video recording itself. In some embodiments, a time code may be generated and added to video recordings on a periodic basis (e.g., time codes may be added to frames every two minutes, added to every other frame, or added to every frame) and the server may determine the appropriate timing adjustment periodically using the embedded time codes. To provide the best resolution for synchronization, the time codes may be embedded within each frame of a video recording. In some cases, the time codes may be added as metadata to each frame of a video recording and not overlaid such that the time codes are not visible from the frames themselves. The time code may be added from a video source (e.g., an RTMP camera) and then overwritten or modified by the server. In some cases, the time codes may be specified using milliseconds, seconds, or fractions of a second.

Figure 3B:
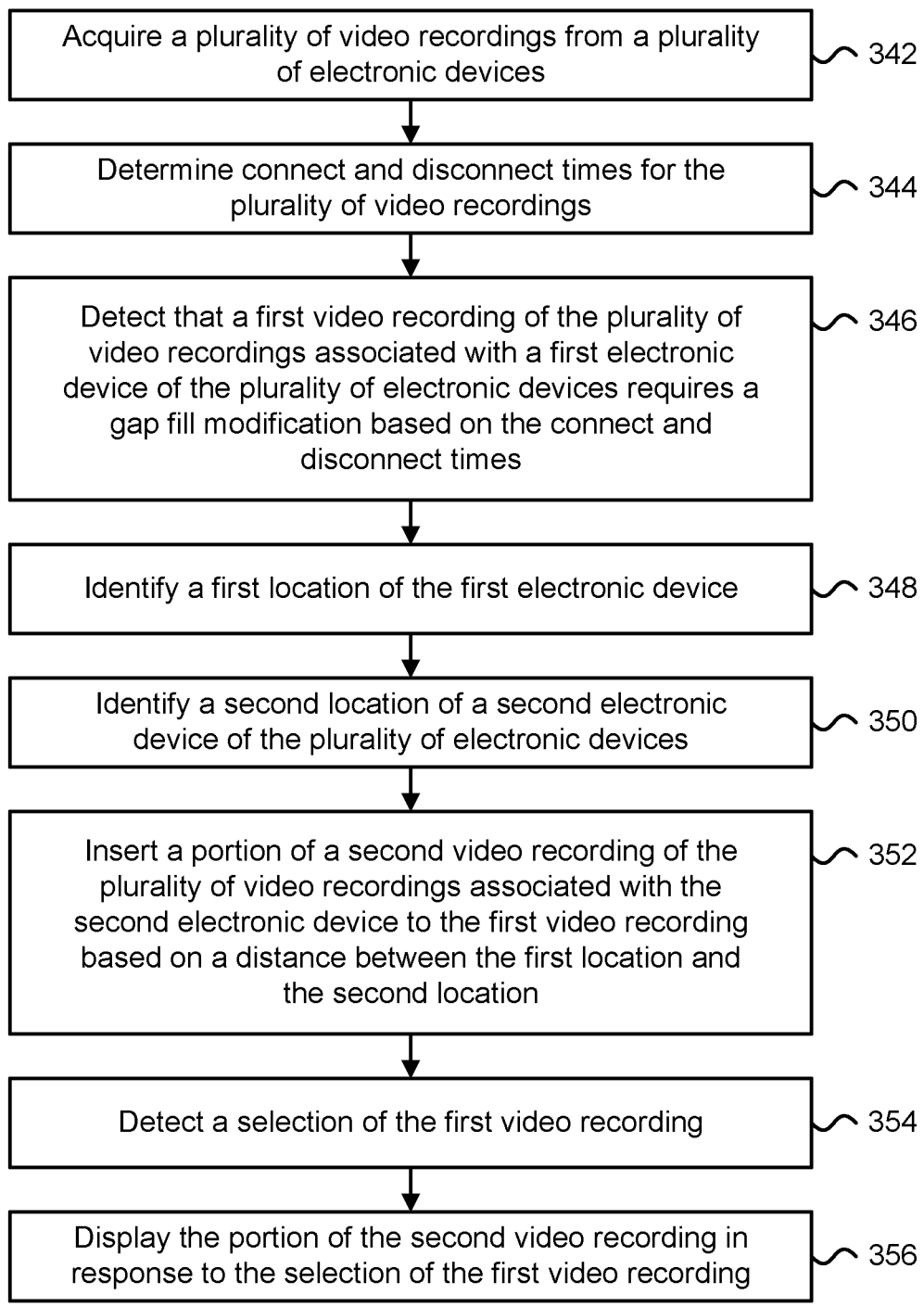
FIG. 3B is a flowchart describing an alternative embodiment of a process for synchronizing and displaying multiple video streams using a computing device.

FIG. 3B is a flowchart describing an alternative embodiment of a process for synchronizing and displaying multiple video streams using a computing device. In one embodiment, the process of FIG. 3B may be performed by a mobile device, such as mobile device 140 in FIG. 1. In another embodiment, the process of FIG. 3B may be performed by a server, such as server 160 in FIG. 1.

In step 342, a plurality of video recordings is acquired from a plurality of electronic devices. In some cases, the plurality of electronic devices may comprise a number of electronic devices used by spectators at a sporting event. In other cases, the plurality of electronic devices may correspond with portable electronic devices used by end users viewing a sporting event from different geographical locations. In step 344, connect and disconnect times for the plurality of video recordings are determined. In one example, the connect and disconnect times for the plurality of video recordings may correspond with the timing metadata depicted in FIG. 2D.

In step 346, it is detected that a first video recording of the plurality of video recordings associated with a first electronic device of the plurality of electronic devices requires a gap fill modification based on the connect and disconnect times. The gap fill modification may be required in order to increase the time duration of the first video recording. In one example, the first video recording may correspond with the video recording for Camera B in FIG. 2E. In step 348, a first location of the first electronic device is identified. In step 350, a second location of a second electronic device of the plurality of electronic devices is identified. The first location of the first electronic device and the second location of the second electronic device may correspond with GPS locations for the two electronic devices.

In step 352, a portion of a second video recording of the plurality of video recordings associated with the second electronic device is added to the first video recording based on a distance between the first location and the second location. In one example, the distance between the first location and the second location may comprise the smallest distance between the first location of the first electronic device and the location of another electronic device of the plurality of electronic devices. In another example, the distance between the first location and the second location may comprise the largest distance between the first location of the first electronic device and the location of another electronic device of the plurality of electronic devices. The portion of the second video recording may be appended to the first video recording. In some cases, the portion of the second video recording may be inserted in the middle of the first video recording. In step 354, a selection of the first video recording is detected. In one example, the selection of the first video recording may correspond with an end user of a mobile computing device selecting the first video recording using a touchscreen display of the mobile computing device. In step 356, the portion of the second video recording is displayed in response to the selection of the first video recording. In one example, in reference to FIG. 2E, if the end user selects to play Camera B at 10:25 AM, then the mobile computing device may display the video recording from Camera A at 10:25 AM with a notification overlay to notify the end user that a video recording substitution has been made.

One embodiment of the disclosed technology includes a memory (e.g., a semiconductor memory, a RAM, or a hard disk) and one or more processors in communication with the memory. The one or more processors configured to acquire a plurality of video recordings from a plurality of electronic devices and identify start and stop times for each video recording of the plurality of video recordings. The one or more processors configured to determine a common time duration for the plurality of video recordings based on the start and stop times for each video recording of the plurality of video recordings. The one or more processors configured to modify a subset of the plurality of video recordings such that each video recording of the plurality of video recordings has the common time duration and transfer the plurality of video recordings subsequent to the modification of the subset of the plurality of video recordings.

In some cases, the one or more processors may be configured to identify a timing gap within a first video recording of the plurality of video recordings and insert a portion of a second video recording of the plurality of video recordings into the timing gap within the first video recording. The one or more processors may be configured to identify a second location of a second electronic device of the plurality of electronic devices and identify the portion of the second video recording based on the second location (e.g., a GPS location).

One embodiment of the disclosed technology includes acquiring a plurality of video recordings, determining an earliest start time for the plurality of video recordings, determining a latest stop time for the plurality of video recording, determining a time duration based on the earliest start time and the latest stop time, modifying at least a subset of the plurality of video recordings such that each video recording of the plurality of video recordings has the same time duration, and displaying one or more of the plurality of video recordings subsequent to modification of the subset of the plurality of video recordings.

As will be understood by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 4:
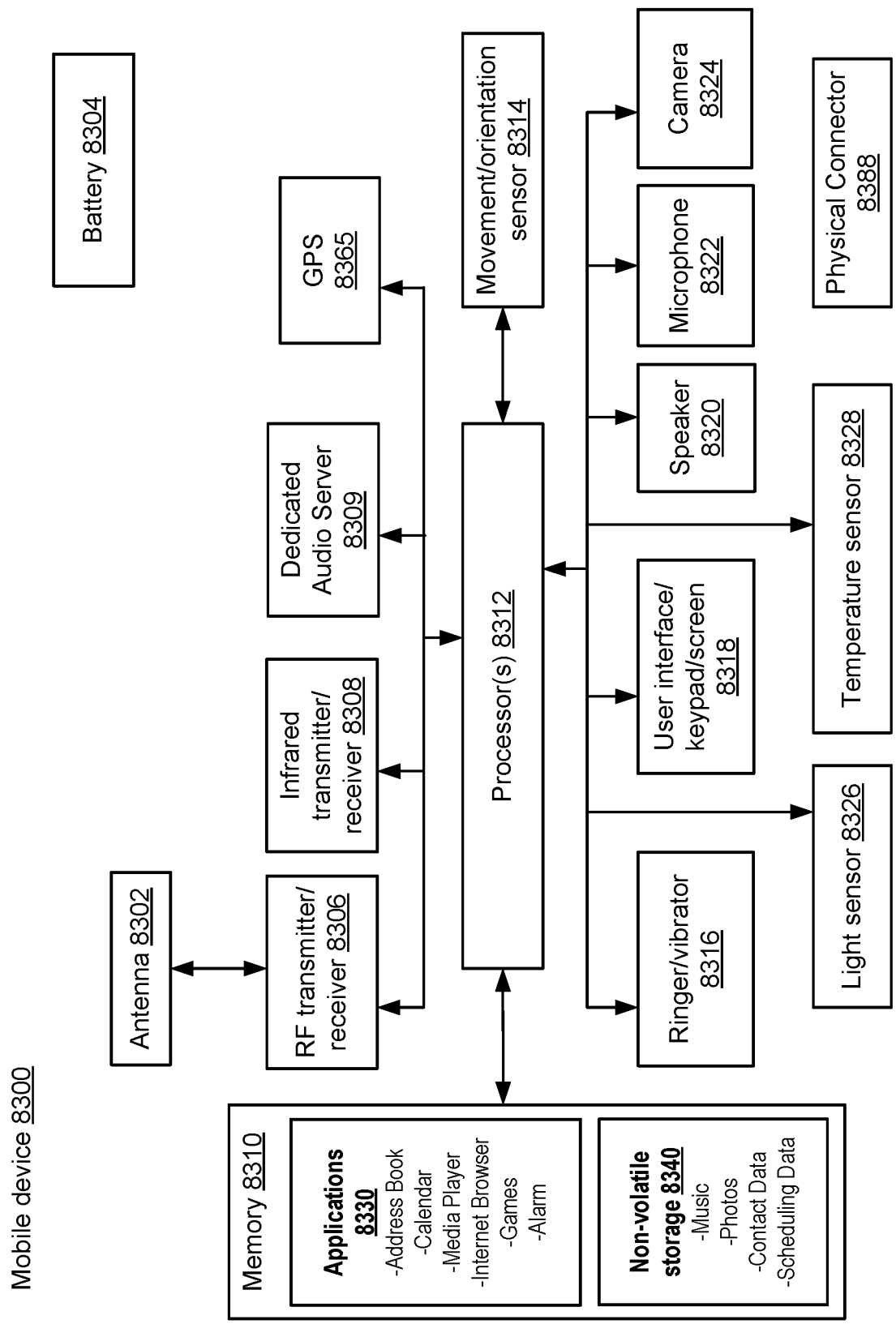
FIG. 4 depicts one embodiment of a mobile device.

The disclosed technology may be used with various computing systems. FIG. 4 depicts one embodiment of a mobile device 8300, which includes one example of an implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   one or more processing circuits in communication with the memory, the one or more processing circuits configured to acquire a plurality of video recordings from a plurality of electronic devices and identify start and stop times for each video recording of the plurality of video recordings, the one or more processing circuits configured to determine a common time duration for the plurality of video recordings based on the start and stop times for each video recording of the plurality of video recordings, the one or more processing circuits configured to modify a subset of the plurality of video recordings such that each video recording of the plurality of video recordings has the common time duration and transfer the plurality of video recordings subsequent to the modification of the subset of the plurality of video recordings, the one or more processing circuits configured to identify a timing gap within a first video recording of the plurality of video recordings and insert a portion of a second video recording of the plurality of video recordings into the timing gap within the first video recording, the one or more processing circuits configured to identify a second electronic device of the plurality of electronic devices based on a location of the second electronic device, the second video recording derives from the second electronic device.

2. The apparatus of claim 1, wherein:
the one or more processing circuits configured to insert a set of video content into the timing gap within the first video recording to increase a time duration of the first video recording.

3. The apparatus of claim 1, wherein:
the one or more processing circuits configured to acquire time codes for the plurality of video recordings and identify the start and stop times for each video recording of the plurality of video recordings based on the time codes.

4. The apparatus of claim 1, wherein:
the one or more processing circuits configured to identify the location of the second electronic device of the plurality of electronic devices and identify the portion of the second video recording based on the location.

5. The apparatus of claim 1, wherein:
the location of the second electronic device comprises a GPS location for the second electronic device.

6. The apparatus of claim 1, wherein:
the one or more processing circuits configured to insert the portion of the second video recording into a middle of the first video recording.

7. The apparatus of claim 1, wherein:
the plurality of video recordings comprises a plurality of Video-On-Demand files.

8. A method, comprising:
acquiring a plurality of video recordings;
determining an earliest start time for the plurality of video recordings;
determining a latest stop time for the plurality of video recording;
determining a time duration based on the earliest start time and the latest stop time;
modifying at least a subset of the plurality of video recordings such that each video recording of the plurality of video recordings has the same time duration, the modifying at least the subset of the plurality of video recordings includes inserting a gap fill recording into a first video recording of the plurality of video recordings, the inserting the gap fill recording into the first video recording includes inserting a portion of a second video recording of the plurality of video recordings into the first video recording;
identifying the gap fill recording for the first video recording based on a distance between a first location associated with the first video recording and a second location associated with the second video recording; and
displaying one or more of the plurality of video recordings subsequent to modification of the subset of the plurality of video recordings.

9. The method of claim 8, wherein:
the displaying one or more of the plurality of video recordings includes displaying the portion of the second video recording in response to selection of the first video recording.

10. The method of claim 8, wherein:
the inserting the gap fill recording into the first video recording includes inserting the gap fill recording at a beginning of the first video recording.

11. The method of claim 8, wherein:
the modifying at least the subset of the plurality of video recordings includes identifying a timing gap within the first video recording of the plurality of video recordings and inserting the portion of the second video recording of the plurality of video recordings into the timing gap within the first video recording.

12. The method of claim 8, further comprising:
generating a seek bar that identifies a portion of the first video recording associated with the gap fill recording; and
displaying the gap fill recording in response to selection of the portion of the first video recording associated with the gap fill recording.

13. The method of claim 8, wherein:
the determining the earliest start time for the plurality of video recordings includes acquiring timing data for the plurality of video recordings and determining the earliest start time using the timing data.

14. The method of claim 13, wherein:
the timing data identifies start and stop times for each of the plurality of video recordings;
the plurality of video recordings corresponds with a plurality of VOD files; and
the acquiring the plurality of video recordings includes acquiring the plurality of video recordings from a server.

15. One or more storage devices containing processor readable code for programming one or more processors to perform a method for synchronizing multiple video recordings, the processor readable code comprising:
processor readable code configured to acquire a plurality of video recordings derived from a plurality of electronic devices;
processor readable code configured to identify connect and disconnect times for each video recording of the plurality of video recordings;
processor readable code configured to determine a time duration based on the connect and disconnect times for each video recording of the plurality of video recordings;
processor readable code configured to modify a subset of the plurality of video recordings such that each video recording of the plurality of video recordings has the time duration, the modification of the subset of the plurality of video recordings includes an insertion of a gap fill recording into a first video recording of the plurality of video recordings, the insertion of the gap fill recording into the first video recording includes inserting a portion of a second video recording of the plurality of video recordings into the first video recording;

processor readable code configured to identify the gap fill recording for the first video recording based on a distance between a first location associated with the first video recording and a second location associated with the second video recording; and processor readable code configured to cause one or more of the plurality of video recordings to be displayed subsequent to modification of the subset of the plurality of video recordings.

\* \* \* \* \*